(12) United States Patent
Walker et al.

(10) Patent No.: US 8,274,553 B2
(45) Date of Patent: Sep. 25, 2012

(54) SYSTEM AND METHOD FOR DISPLAYING STEREOSCOPIC DIGITAL MOTION PICTURE IMAGES

(75) Inventors: Bradley W. Walker, Dallas, TX (US); Stephen R. Burket, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1958 days.

(21) Appl. No.: 11/253,771

(22) Filed: Oct. 18, 2005

(65) Prior Publication Data

US 2007/0085902 A1    Apr. 19, 2007

(51) Int. Cl.
*G03B 35/00* (2006.01)
*H04N 13/04* (2006.01)
(52) U.S. Cl. ............................ 348/51; 348/42; 348/54
(58) Field of Classification Search .................... 348/42, 348/43, 51, 53, 54, 56–59; 359/462, 464, 359/465
See application file for complete search history.

(56) References Cited

U.S. PATENT DOCUMENTS

| | | | | |
|---|---|---|---|---|
| 4,393,400 | A * | 7/1983 | Ikushima et al. | 348/56 |
| 4,974,074 | A * | 11/1990 | Tenma | 348/43 |
| 5,831,638 | A * | 11/1998 | West et al. | 345/539 |
| 6,157,374 | A * | 12/2000 | West et al. | 345/539 |
| 6,448,952 | B1 * | 9/2002 | Toyoda et al. | 345/97 |
| 6,791,599 | B1 * | 9/2004 | Okada et al. | 348/56 |
| 6,977,629 | B2 * | 12/2005 | Weitbruch et al. | 345/6 |
| 7,411,611 | B2 * | 8/2008 | Bracke | 348/218.1 |
| 7,626,587 | B1 * | 12/2009 | de Waal et al. | 345/536 |
| 2001/0043266 | A1 * | 11/2001 | Robinson et al. | 348/53 |
| 2002/0118277 | A1 * | 8/2002 | Divelbiss et al. | 348/56 |
| 2004/0032980 | A1 * | 2/2004 | Harman | 382/154 |
| 2004/0252756 | A1 * | 12/2004 | Smith et al. | 348/42 |
| 2005/0046700 | A1 * | 3/2005 | Bracke | 348/218.1 |
| 2005/0117637 | A1 * | 6/2005 | Routhier et al. | 375/240.01 |
| 2005/0128584 | A1 * | 6/2005 | Shulman et al. | 359/462 |
| 2007/0008406 | A1 * | 1/2007 | Shestak et al. | 348/58 |
| 2007/0013624 | A1 * | 1/2007 | Bourhill | 345/84 |
| 2007/0035707 | A1 * | 2/2007 | Margulis | 353/122 |
| 2009/0051759 | A1 * | 2/2009 | Adkins et al. | 348/53 |
| 2009/0184984 | A1 * | 7/2009 | Takahara | 382/168 |

* cited by examiner

*Primary Examiner* — Kimberly A Williams
(74) *Attorney, Agent, or Firm* — Warren L. Franz; Wade J. Brady, III; Frederick J. Telecky, Jr.

(57) ABSTRACT

In accordance with the teachings of the present invention, a system and method for displaying stereoscopic digital motion picture images are provided. In a particular embodiment of the present invention, the method includes receiving at a digital video projector one or more frames of left-eye data and one or more frames of right-eye data, receiving at the digital video projector an input reference signal indicating whether each frame of data comprises left-eye data or right-eye data, receiving at the digital video projector a display reference signal indicating whether left-eye data or right-eye data should be projected at a particular time, and projecting the left-eye data and right eye data, as indicated by the display reference signal, separated by periods of dark time. In another embodiment of the present invention, the method includes receiving at a digital video projector one or more frames of left-eye data and one or more frames of corresponding right-eye data, receiving at the digital video projector an input reference signal indicating whether each frame of data comprises left-eye data or right-eye data, projecting the corresponding frames of left-eye data and right eye data separated by periods of dark time, and transmitting from the digital video projector an output reference signal indicating initiation of the periods of dark time.

18 Claims, 3 Drawing Sheets

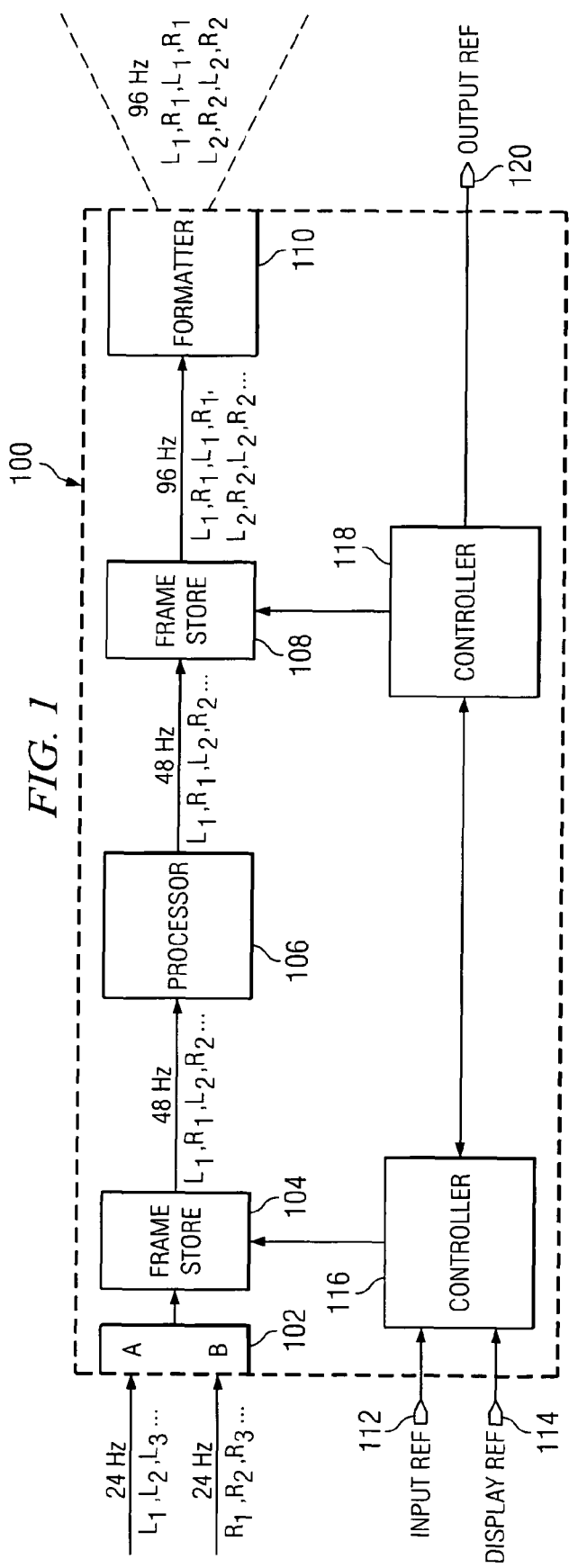

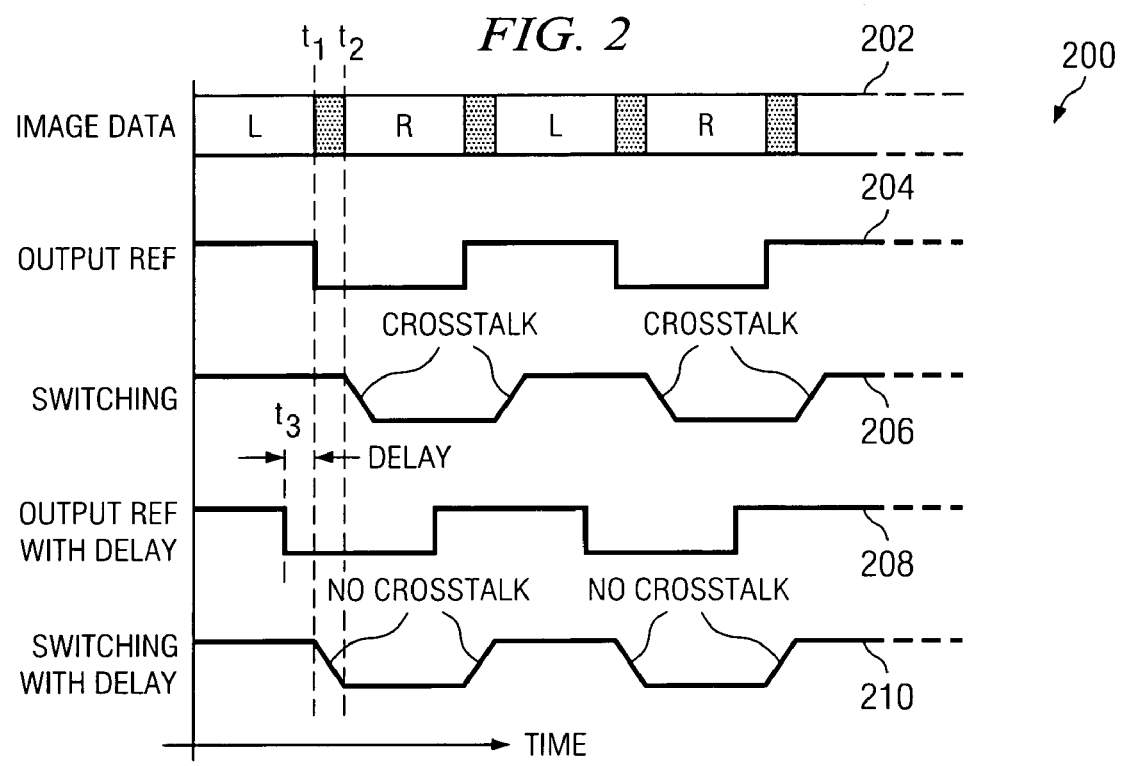

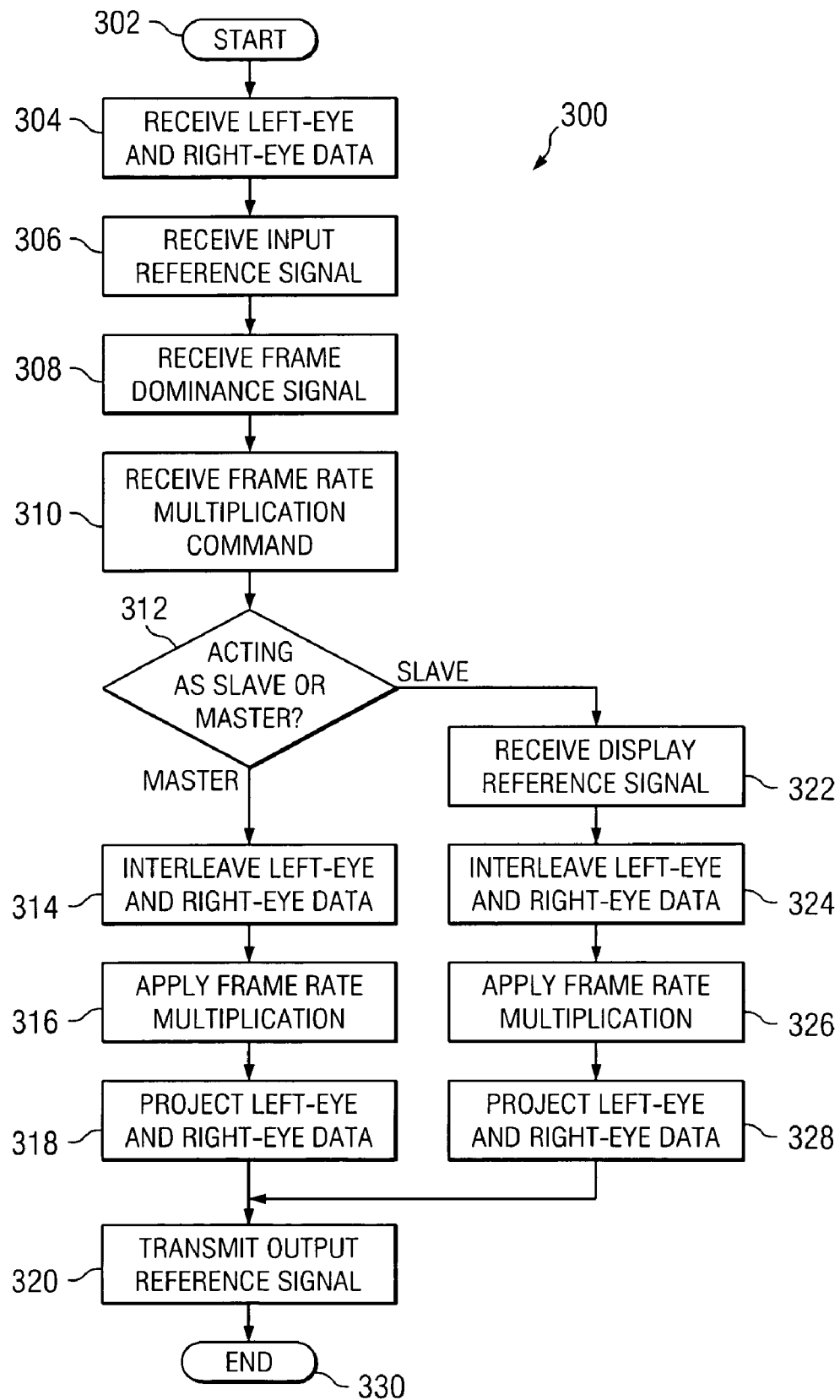

SYSTEM AND METHOD FOR DISPLAYING STEREOSCOPIC DIGITAL MOTION PICTURE IMAGES

TECHNICAL FIELD

This invention relates generally to digital projection systems and, more particularly, to a system and method for displaying stereoscopic digital motion picture images.

BACKGROUND

Stereoscopic, or three-dimensional, motion picture images create the illusion of depth by presenting two slightly different images to a viewer. When the images are viewed in such a way that each of the viewer's eyes only sees one of the images, the viewer's visual cortex interprets the pair of images as a single three-dimensional image. In digital stereoscopic projection systems employing a single projector, the stereoscopic effect is typically produced by projecting a left image and a right image sequentially during a normal frame of video. A stereo switching mechanism, such as a polarizing filter, circular polarization, or active shutter glasses, is then used to direct the left and right images to the proper eye of the viewer. For example, a polarizing filter attached to the lens of the projector may direct the left and right images to the proper eye by switching between two orthogonal states—one for the left image, one for the right image. Typically, the stereo switching mechanism transitions from the left image state to the right image state and back during the "dark time" of the system, when a black image is shown between each image.

SUMMARY OF THE INVENTION

In accordance with the teachings of the present invention, a system and method for displaying stereoscopic digital motion picture images are provided. In a particular embodiment of the present invention, the method comprises receiving at a digital video projector one or more frames of left-eye data and one or more frames of right-eye data, receiving at the digital video projector an input reference signal indicating whether each frame of data comprises left-eye data or right-eye data, receiving at the digital video projector a display reference signal indicating whether left-eye data or right-eye data should be projected at a particular time, and projecting the left-eye data and right eye data, as indicated by the display reference signal, separated by periods of dark time.

In another embodiment of the present invention, the method comprises receiving at a digital video projector one or more frames of left-eye data and one or more frames of corresponding right-eye data, receiving at the digital video projector an input reference signal indicating whether each frame of data comprises left-eye data or right-eye data, projecting the corresponding frames of left-eye data and right eye data separated by periods of dark time, and transmitting from the digital video projector an output reference signal indicating initiation of the periods of dark time.

In yet another embodiment of the present invention, the method comprises receiving at a digital video projector one or more frames of left-eye data and one or more frames of right-eye data, receiving at the digital video projector a frame rate multiplication command indicating a number of frames to project during a base rate time and a number of frames that constitute a full frame of image data, and projecting the one or more frames of left-eye and right-eye data based upon the frame rate multiplication command, wherein a ratio between the number of frames of data displayed during the base rate time and the number of frames of data that constitute a full frame of image data is a non-integer.

A technical advantage of some embodiments of the present invention includes the ability to synchronize a projector with other components of a stereoscopic projection system, such as polarizing filters or active shutter glasses. For example, by including an input reference signal and an output reference signal, particular embodiments of the present invention allow a projector to behave as a master in a projection system, dictating the operation of the other components. Similarly, by including an input reference signal and an display reference signal, particular embodiments of the present invention allow a projector to behave as a slave in a projection system, having its operation dictated to it by another component.

Another technical advantage of some embodiments of the present invention includes improved stereoscopic performance. By allowing a user to input left and right data at low frame rates, while specifying that the data be projected at a higher frame rate, particular embodiments help to reduce the occurrence of flicker and motion artifacts. As the frame rate increases, and as the left and right images are flashed more times during a typical frame, the performance of the system approaches that of a two-projector system.

Yet another technical advantage of some embodiments of the present invention includes reduced occurrences of stereoscopic crosstalk. By tuning the dark time of the system to the transition time of the polarizing filter, particular embodiments of the present invention help reduce the occurrence of stereoscopic crosstalk or ghosting. In particular embodiments, this may include adjusting the duration of the dark time itself by running the projector's formatter at a higher rate and/or adding a positive or negative delay to an output reference signal to compensate for the characteristics of the switching mechanism.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which:

FIG. 1 illustrates a system for displaying stereoscopic digital motion picture images in accordance with a particular embodiment of the present invention;

FIG. 2 illustrates an output reference delay in accordance with a particular embodiment of the present invention; and FIG. 3 illustrates a flowchart of a method of displaying stereoscopic digital motion picture images in accordance with a particular embodiment of the present invention.

DESCRIPTION OF EXAMPLE EMBODIMENTS

In accordance with the teachings of the present invention, a system and method for displaying stereoscopic digital motion picture images are provided. In accordance with a particular embodiment of the present invention, the method comprises receiving at a digital video projector one or more frames of left-eye data and one or more frames of corresponding right-eye data, receiving at the digital video projector an input reference signal indicating whether each frame of data comprises left-eye data or right-eye data, projecting the corresponding frames of left-eye data and right eye data separated by periods of dark time, and transmitting from the digital video projector an output reference signal indicating initiation of the periods of dark time and whether left-eye data or right-eye data is being projected.

In another embodiment of the present invention, the method comprises receiving at a digital video projector one or more frames of left-eye data and one or more frames of right-eye data, receiving at the digital video projector an input reference signal indicating whether each frame of data comprises left-eye data or right-eye data, receiving at the digital video projector a display reference signal indicating whether left-eye data or right-eye data should be projected at a particular time, and projecting the left-eye data and right eye data, as indicated by the display reference signal, separated by periods of dark time.

By including an input reference signal, an output reference signal, and/or a display reference signal, particular embodiments of the present invention offer the ability to synchronize a projector's operation with that of other components of the projection system. This helps improve the stereoscopic performance of the system by reducing stereoscopic crosstalk. Other embodiments of the system may help to further improve stereoscopic performance by reducing flicker and motion artifacts in the projected image by increasing the frame rate at which the left-eye and right-eye data is projected.

FIG. 1 illustrates digital video projector 100 in accordance with a particular embodiment of the present invention. Generally, projector 100 is a digital video projector that may be employed in a stereoscopic projection system to display stereoscopic image data. As shown in FIG. 1, projector 100 comprises an input interface 102, a first frame store 104, an optional processor 106, a second frame store 108, and a formatter 110. However, it should be recognized by one skilled in the art that in particular embodiments of the present invention, frame stores 104 and 108 may be combined into a single frame store at frame store 108. In particular embodiments, projector 100 also includes a controllers 116 and 118, which are associated with frame stores 104 and 108.

Generally, left-eye and right-eye data enters projector 100 at input interface 102. In particular embodiments of the present invention, this data may be received through one or more HD-SDI or DVI cables. In the event this data is received over more than one cable, the data is fed through a multiplexer (not illustrated) and passed on to frame store 104. Frame store 104 receives the data from input interface 102 and interleaves the corresponding left-eye and right-eye data. The interleaved left-eye and right-eye data is then passed to processor 106, where the data may undergo further image processing. In other embodiments, where the left-eye data and right-eye data are received over a single cable with the data already interleaved, frame store 104 may simply be omitted.

The interleaved left-eye and right-eye data is then passed to a second frame store 108. In particular embodiments of the present invention, frame store 108 increases the frame rate of the left-eye and right-eye data, in what is known as frame rate multiplication. This allows projector 100 to receive input data at a low frame rate, while projecting the data at a higher frame rate. In particular embodiments, this is accomplished by repeating the already interleaved left-eye and right-eye data one or more times during a typical frame. In particular embodiments of the present invention, this may be done by repeating the input frames at an integer multiple or integer ratio (non-integer multiple) of the input frame rate.

In such a system, frame rate multiplication may be based on a N/M system, where N is defined as the number of frames of data to be displayed during a base rate time and M is defined as the number of input frames of data (defined by the input vertical sync) that are required to constitute a full frame of image data. Therefore, in such embodiments, the ratio between N and M is the ratio of two integers. Thus, depending on the values of N and M selected, the N/M ratio may be equivalent to an either an integer (e.g., 4/2=2) or a non-integer (e.g., 5/2=2.5).

For example, in a system where N=4 and M=2, projector 100 may receive input data at 24 Hz. This left-eye and right-eye data is then interleaved into a single 48 Hz data stream comprising both left-eye and right-eye data (i.e., L1, R1, L2, R2, etc.) by frame store 104. Frame store 108 then takes the interleaved, 48 Hz data stream and repeats each set of left-eye and right-eye data (i.e., L1, R1, L1, R1, L2, R2, L2, R2) such that the data stream becomes a 96 Hz data stream.

In another embodiment where N=5 and M=2, projector 100 may receive input data at 24 Hz. This left-eye and right-eye data is then interleaved into a single 48 Hz data stream comprising both left-eye and right-eye data (i.e., L1, R1, L2, R2, etc.) by frame store 104. Frame store 108 then takes the interleaved, 48 Hz data stream and repeats the input data at a 5/2 ratio (i.e., L1, R1, L1, R1, L1, R2, L2, R2, L2, R2) such that the data stream becomes a 120 Hz data stream.

In a typical system, M equals 1 or 2, while N equals an integer greater equal to or greater than M (such that N/M≧1). Generally the larger the ratio between N and M, the better the stereoscopic performance of the system. In particular embodiments of the present invention, the N/M ratio is based on a predetermined ratio. In other embodiments, frame store 108 may receive a frame rate multiplication command (not illustrated) indicating a N/M ratio to be applied. This allows for greater system flexibility and allows the frame rate multiplication to be altered based on the input image data.

Once the frame rate has been multiplied by frame store 108, the frame rate multiplied left-eye and right-eye data is then passed to formatter 110, which includes a digital micromirror device ("DMD"), spatial light modulator, LCoS, LCD, or some other component for projecting the image data. In particular embodiments of the present invention formatter 110 may actually comprise one or more separate formatters. For example, formatter 110 may comprise three different formatters: one formatter for the color red, one formatter for the color green, and one formatter for the color blue.

In particular embodiments of the present invention, formatter 110 is also responsible for inserting black image data between the left-eye data and right-eye data. Typically, these slugs of black image data are referred to as "dark time." In particular embodiments, this is accomplished by running formatter 110 faster than the input data rate, so that the formatter finishes before the end of the frame. Black image data is then projected the remainder of the frame. By adjusting the speed at which formatter 110 outputs data, the length of the dark time may be adjusted. In particular embodiments, this adjustability may be used to tune the length of the dark time to match the transition time of the polarizing filters or shutter glasses being used in conjunction with projector 100. The better the dark time is synchronized with the transition time, the less likely stereoscopic crosstalk is to occur.

In particular embodiments, formatter 110 may also perform the frame rate multiplication discussed above with regard to frame store 108. In such an embodiment, formatter 110 includes a dedicated frame store (not specifically illustrated). Since this frame store is internal to formatter 110 and not separated from the formatter by a bus, the frame rate multiplication is not limited by the bus speed between the frame store and formatter 110.

In order to facilitate and optimize the stereoscopic performance of projector 100, particular embodiments of the present invention may also include one or more reference signals used to receive or transmit information to and from other components of the stereoscopic projection system of which projector 100 is a part. In particular embodiments, these reference signals may include an input reference signal 112, a display reference signal 114, and/or an output reference signal 120.

As shown in FIG. 1, input reference signal 112 is received by controller 116 and is used to specify whether a specific frame of input data has left-eye data or right-eye data. Controller 116 then passes this information to frame store 104 which uses it to interleave the corresponding left-eye and right-eye data. In particular embodiments of the present invention, input reference signal 112 may be embedded in the input image data, using one of several known methodologies (e.g., white/blue line encoding). In other embodiments of the present invention, particularly where left-eye data and right-eye data are received on separate inputs, input reference signal 112 may be implied. For example, a user may specify that a first input receives left-eye data and that a second input receives right-eye data. In other embodiments, input reference signal 112 may be received separately from the input image data, as shown in FIG. 1. In particular embodiments, input reference signal 112 may also include a frame dominance signal (not illustrated) that specifies which frame of eye data is dominant. This tells projector 100 which frames of data go together to make a complete image and which frame (left-eye or right-eye) should be projected first.

Particular embodiments of the present invention may also include a display reference signal 114. Display reference signal 114 is also received by controller 116 and is used to specify which frame of data (left-eye or right-eye) is to be displayed during a specific display frame. The inclusion of display reference signal 114 (along with input reference 112) allows projector 100 to behave as a slave to other components in a stereoscopic projection system. For example, projector 100 could receive display reference signal 114 from an associated polarizing filter (not illustrated) specifying when projector 100 should display a left-eye image or a right-eye image, based upon the switching of the filter. Similarly, projector 100 could be used in a multi-projector system and receive synchronization information over display reference signal 114. In other embodiments, display reference signal 114 may simply be referenced to the display frame rate that is specified by the frame rate multiplication command. Display reference signal 114 then allows projector 100 to accommodate for, or synchronize with, the timing of other system components.

Particular embodiments of the present invention may also include an output reference signal 120 from controller 118, which is coupled with frame store 108 and/or formatter 110. Generally, output reference signal 120 indicates the start of dark time for each displayed frame to an external component, such as the polarizing filter of active shutter glasses used in conjunction with projector 100. In particular embodiments, output reference signal 120 may also specify which frame of eye data (left-eye or right-eye) is being displayed. Like display reference signal 114, output reference signal 120 may also be referenced to the display frame rate specified by the frame rate multiplication command in particular embodiments of the present invention. The inclusion of output reference signal 120 (along with input reference signal 112) allows projector 110 to behave as master of a stereoscopic projection system. In such a system, other components, such as the polarizing filters or active shutter glasses, may be driven based upon this signal.

Since these components have a delayed response to output reference signal 120, particular embodiments of the present invention also include the ability to apply a positive or negative delay to output reference signal 120 to compensate for these system timing needs as well as internal processing delays. In particular embodiments, this delay may include a time or phase delay. An example of one such time delay is shown in FIG. 2.

FIG. 2 illustrates the timing diagrams for the projected image data 202, output reference 204 and slave component switching 206. As shown in FIG. 2, image data 202 comprises alternating left-eye and right-eye data separated by segments of dark time. For example, image data 202 includes a segment of dark time between times t1 and t2. By default, the output reference 204, which is illustrated as a step function, switches from high to low at the start of this dark time at t1. However, the switching of the polarizing filter associated with the projector, illustrated by slave component switching function 206, may be delayed. In particular embodiments, the switching response may also be non-instantaneous (i.e., gradual). This can result in stereoscopic crosstalk, or ghosting, when the switching transition occurs outside of the dark time. To compensate for this delayed, non-instantaneous response, particular embodiments of the present invention may apply a positive or negative delay to output reference 204. This delayed output reference is illustrated as delayed output reference 208. As shown in FIG. 2, output reference 208 switches from high to low at time t3, which occurs prior to the start of the dark time at time t1. By applying the appropriate delay (i.e. selecting the appropriate time t3), the transition of the switching function may be synchronized with the dark time, as shown by delayed switching function 210. Furthermore, if the switching transition time is greater than the duration of the dark time, particular embodiments of the present invention may also adjust the duration dark time to encompass the transition, as discussed above.

A better understanding of the operation of a digital video projector in accordance with a particular embodiment of the present invention may be had by making reference to FIG. 3, which illustrates flowchart 300 of a method of displaying stereoscopic images in accordance with a particular embodiment of the present invention. As shown in FIG. 3, flowchart 300 begins at step 302. Projector 100 then receives left-eye and right-eye image data at step 304, an input reference signal at step 306, a frame dominance signal at step 308, and a frame multiplication command at step 310. A determination is then made at step 312 whether the projector 100 is operating as a master or a slave of a stereoscopic projection system.

If projector 100 is operating as a master, projector 100 interleaves the left-eye and right-eye data at step 314, the frame rate multiplication is applied in step 316, and the interleaved, frame-rate-multiplied left-eye and right-eye image data is projected at step 318. Since projector 100 is operating as a master, at step 320 the projector transmits an output reference signal indicating the initiation of the dark time in the projected image data and whether left-eye data or right-eye data is being projected. Flowchart 300 then terminates at step 330.

However, if projector 100 is operating as a slave to another component, projector 100 then receives a display reference signal from the other component at step 322. Projector 100 then interleaves the left-eye and right-eye image data at step 324, applies the frame rate multiplication at step 326, and projects the left-eye and right-eye data as indicated by the display reference signal at step 328. In particular embodiments, projector 100 may then transmit an output reference signal indicating the initiation of the dark time in the projected image data and whether left-eye data or right-eye data is being projected at step 320. Flowchart 300 then terminates at step 330.

By displaying stereoscopic digital motion picture images in accordance with the teachings of the present invention, particular embodiments of the present invention offer improved stereoscopic performance with reduced flicker, reduced motion artifacts, and/or reduced stereoscopic crosstalk. Additionally, particular embodiments of the present invention offer the ability to function as a master or slave in a stereoscopic projection system. Particular embodiments of the present invention also offer the ability to receive left-eye and right-eye image data at low frame rates and then project the data at a higher frame rate by repeating the left-eye and right-eye image data, interleaved in time. Finally, particular embodiments of the present invention allow the performance of the projector to be synchronized with that of other components, for example, by adjusting the duration of the projected dark time and the timing and phase of the output reference signal.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method of displaying stereoscopic digital motion picture images, comprising:
    receiving at a digital video projector one or more frames of left-eye data and one or more frames of right-eye data;
    receiving at the digital video projector a frame rate multiplication command indicating a number of frames to project during a base rate time and a number of frames that constitute a full frame of image data; and
    projecting the one or more frames of left-eye and right-eye data based upon the frame rate multiplication command;
    wherein a ratio between the number of frames of data displayed during the base rate time and the number of frames of data that constitute a full frame of image data is a non-integer; and
    wherein each base rate time period comprises a constant integer number of both left-eye and right-eye frames plus one additional frame that alternates between a left-eye frame and a right-eye frame each base rate time period.

2. The method of claim 1, wherein the ratio between the number of frames of data displayed during the base rate time and the number of frames of data that constitute a full frame of image data is 5:2.

3. A method of displaying stereoscopic digital motion picture images, comprising:
    receiving at a digital video projector one or more frames of left-eye data and one or more frames of corresponding right-eye data;
    receiving at the digital video projector an input reference signal indicating whether each frame of data comprises left-eye data or right-eye data;
    projecting the corresponding frames of left-eye data and right eye data separated by periods of dark time, wherein the dark time duration is adjustable in length independently of frame rate; and
    transmitting from the digital video projector an electronic output reference signal indicating initiation of the periods of dark time, wherein the output reference signal is adjustable between a first timing position preceding a beginning of a corresponding dark period and a second position trailing the beginning of the corresponding dark period.

4. The method of claim 3, wherein the input reference signal is embedded in the frames of left-eye and right-eye data.

5. The method of claim 3, wherein the input reference signal is separate from the frames of left-eye and right-eye data.

6. The method of claim 3, wherein the input reference signal is derived from one or more inputs through which the left-eye data and right-eye data are received.

7. The method of claim 3, wherein the output reference signal includes a positive or negative delay.

8. The method of claim 3, further comprising adjusting the periods of dark time to approximate a transition time of a stereo switching mechanism.

9. The method of claim 3, further comprising receiving at the digital video projector a display reference signal indicating whether left-eye data or right-eye data should be projected at a particular time.

10. The method of claim 3, further comprising receiving at the digital video projector a frame dominance signal indicating whether the left-eye data or right-eye data is dominant.

11. The method of claim 3, further comprising receiving at the digital video projector a frame rate multiplication command indicating a number of frames to project during a base rate time and a number of frames that constitute a full frame of image data.

12. A method of displaying stereoscopic digital motion picture images, comprising:
    receiving at a digital video projector one or more frames of left-eye data and one or more frames of right-eye data;
    receiving at the digital video projector an input reference signal indicating whether each frame of data comprises left-eye data or right-eye data;
    receiving at the digital video projector a display reference signal indicating whether left-eye data or right-eye data should be projected at a particular time;
    projecting the left-eye data and right eye data, as indicated by the display reference signal, separated by periods of dark time;
    transmitting from the digital video projector an output reference signal indicating initiation of the periods of dark time; and
    adjusting a start of the output reference signal within a range beginning at point preceding a start of a corresponding dark time and ending at an end of the corresponding dark time.

13. The method of claim 12, wherein the input reference signal is embedded in the frames of left-eye and right-eye data.

14. The method of claim 12, wherein the input reference signal is separate from the frames of left-eye and right-eye data.

15. The method of claim 12, wherein the input reference signal is implied from one or more inputs through which the left-eye data and right-eye data are received.

16. The method of claim 12, further comprising receiving at the digital video projector a frame dominance signal indicating whether the left-eye data or right-eye data is dominant.

17. The method of claim 12, further comprising adjusting the periods of dark time to approximate a transition time of a stereo switching mechanism.

18. The method of claim 12, further comprising receiving at the digital video projector a frame rate multiplication command indicating a number of frames to project during a base rate time and a number of frames that constitute a full frame of image data.

* * * * *